United States Patent [19]

Warren

[11] 4,114,226
[45] Sep. 19, 1978

[54] WEAR RESISTANT ALPHA ALUMINA ARTICLE USEFUL TO CLEAN MAGNETIC TAPE AND THE PROCESS OF PRODUCING SAID

[75] Inventor: Peter Carter Warren, El Cajon, Calif.

[73] Assignee: Union Carbide Corporation, New York, N.Y.

[21] Appl. No.: 773,223

[22] Filed: Mar. 1, 1977

[51] Int. Cl.² ............................................. B28D 5/00
[52] U.S. Cl. .............................. 15/236 R; 15/236 A; 125/30 R; 125/36; 428/357
[58] Field of Search .............. 15/236 R, 236 A, 93 R; 125/30 R, 36

[56]         References Cited
       U.S. PATENT DOCUMENTS 3,587,128  6/1971  Gaultieri ............................ 15/93 R
3,616,478  11/1971  Martz et al. ......................... 15/93 R
3,757,374  9/1973  Baskin et al. ........................ 15/93 R
3,834,265  9/1974  Tafapolsky et al. .................. 125/39
4,004,317  1/1977  Beedle ................................. 15/93 R

OTHER PUBLICATIONS

Wiederhorn *Journal of the American Ceramic Society*, 52, (9) 485–491, (1969).

*Primary Examiner*—James C. Cannon
*Attorney, Agent, or Firm*—Frederick J. McCarthy, Jr.

[57]                 ABSTRACT

A fracture resistant wearing edge is provided on unicrystalline alpha alumina material by the intersection of planar surfaces which are parallel to m-planes of the unicrystalline alpha alumina. Such planar surfaces intersect at an angle of 60° or 120° and the intersection of such surfaces is an edge substantially parallel to the C-axis of the unicrystalline alpha alumina material.

3 Claims, 11 Drawing Figures

WEAR RESISTANT ALPHA ALUMINA ARTICLE USEFUL TO CLEAN MAGNETIC TAPE AND THE PROCESS OF PRODUCING SAID

The present invention is directed to novel unicrystalline alpha alumina wearing edges, particularly articles, such as scraping blades, used for cleaning debris from magnetic tape.

The magnetic tape industry requires magnetic tape to be cleaned of adherent contaminants which can occur on the ferrite coating of the tape. This cleaning is particularly important with tape used in computer applications in order to avoid erroneous data recording. Sapphire, and other materials have been used, frequently in prism shapes as scraping blades, to provide high quality, low wearing edges for applications of the type noted above. As far as is known, very careful and skillful hand lapping and possibly other operations are presently employed in order to provide high quality, low wearing edges on sapphire, which edges are required to be essentially free of work damage at the intersection of the prism faces.

In the absence of such careful and skillful handling, the wearing edges of presently known sapphire articles are prone to fracture due to deformation during preparation and in use.

It is an object of the present invention to provide a unicrystalline alpha alumina body, e.g. sapphire, having high quality, fracture resistant wearing edges which can be provided using conventional mechanical grinding and polishing techniques.

Other objects will be apparent from the following description and claims taken in conjucntion with the drawing wherein.

Figure 1A:
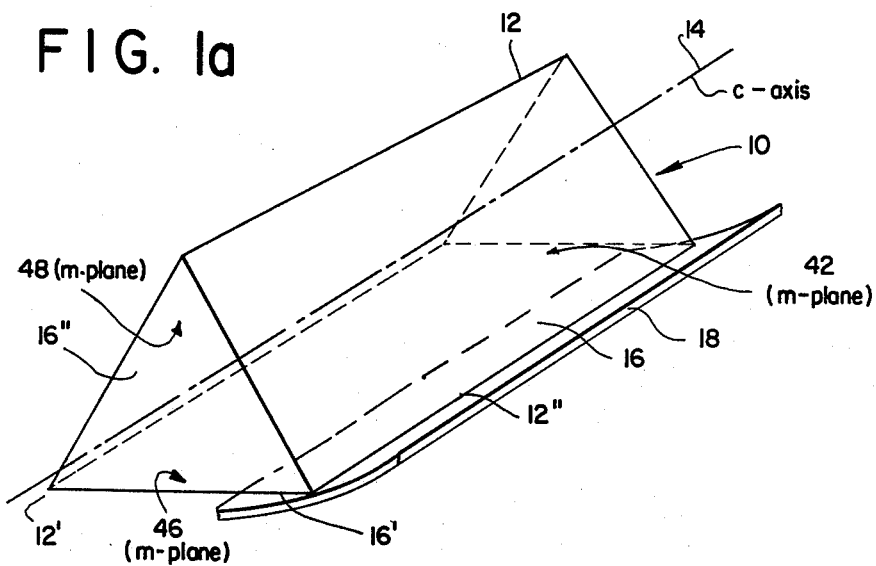
FIGS. 1a and 1b show a unicrystalline alpha alumina article in accordance with the present invention.
Figure 1B:
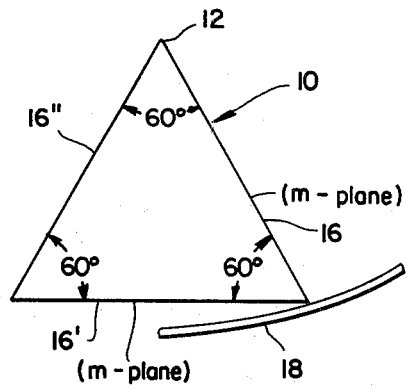

An article of manufacture in accordance with the present invention for use as a wearing edge is formed of unicrystalline alpha alumina, e.g. unicrystalline sapphire, and has a wearing edge substantially parallel to the C-axis of the unicrystalline body. Planar surfaces are provided which intersect at the wearing edge at an angle of substantially about 60° or 120°, and each planar surface is positioned so as to be aligned with with an m-plane $[10\bar{1}0]$, $[\bar{1}010]$, $[01\bar{1}0]$, $[0\bar{1}10]$, $[\bar{1}100]$, $[1\bar{1}00]$, of the unicrystalline body. In a particular embodiment of the present invention, the unicrystalline alpha alumina body is in the shape of an equilateral prism having its longitudinal axis parallel (within about ± 5°) to the C-axis of the unicrystalline material and each of its faces aligned (within about ± 5°) with an m-plane of the unicrystalline material and intersecting at an angle of 60°. This embodiment is illustrated in FIGS. 1a and 1b wherein an equilateral prism formed of unicrystalline alpha alumina e.g. sapphire, is shown at 10 having a wearing edge at 12 (and also at 12' and 12"). The longitudinal axis 14 of the prism 10 is aligned with the C-axis of the unicrystalline material as indicated and each planar prism face 16, 16', 16" is aligned with an m-plane $\{10\bar{1}0\}$ of the unicrystalline material. Such a body having high quality wearing edges 12, 12', 12" can be manufactured following relatively inexpensive conventional mechanical grinding practices as hereinafter described and can be used as scrapers and the like in cleaning debris from magnetic tape indicated schematically at 18 in FIGS. 1a and 1b. The magnetic tape is drawn across a wearing edge in the same manner as is presently conventionally employed with available scraping devices. In addition to enabling the use of conventional mechanical grinding techniques in fabrication without work damage to the wearing edge, the wearing edge in accordance with the present invention is highly resistant to fracture damage in use. These features of the present invention are due to the unique crystallographic orientation provided in the article of the present invention as hereinafter described.

Figure 2A:
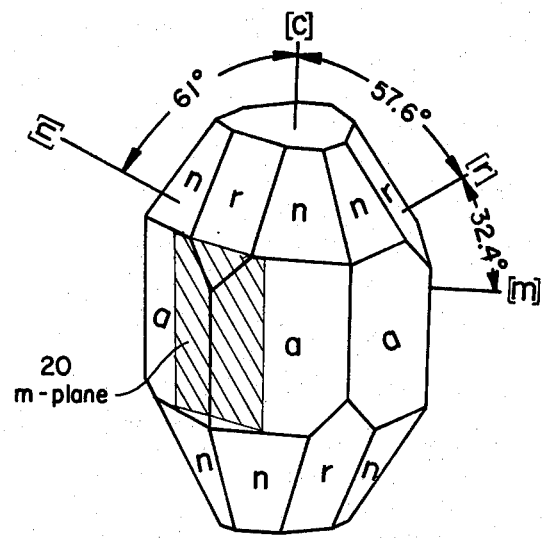
FIGS. 2a and 2b illustrate the structure of unicrystalline alpha alumina.
Figure 2B:
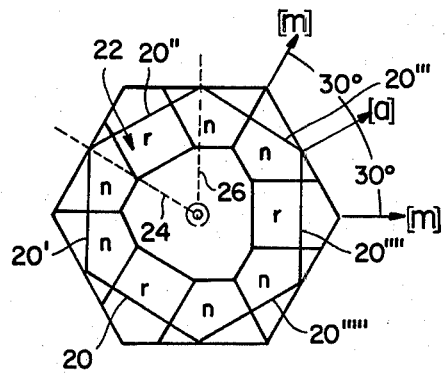
Figure 2C:
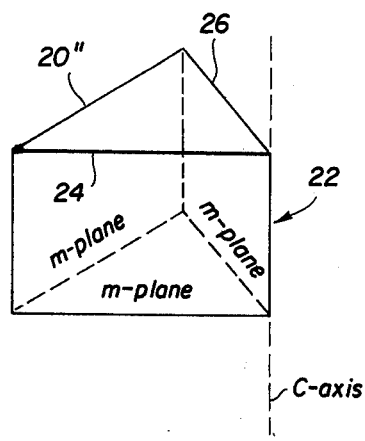
FIG. 2c illustrates a prism shaped device obtained from unicrystalline material of FIG. 2b.

With reference to FIG. 2a a crystal of alpha alumina, e.g. sapphire is isometrically represented showing various conventionally designated faces and axes of the crystal (see also Acta Metallurgica, Vol. 5, 1957 — Article by M.L. Kronberg). FIG. 2b is a "plan" view of the crystal of FIG. 2a. It can be seen from FIG. 2b that the m-plane faces 20, 20' etc. (only one of which is shown in FIG. 2a for purposes of clarity) lie in a hexagonal configuration about the C-axis of the crystal. Thus, an equilateral prism 22 can be obtained from such a crystal having planar faces e.g. 20, 24, 26 which are aligned with an m-plane of the crystal and having its longitudinal axis and edges parallel to the C-axis of the crystal as shown in FIG. 2c.

Figure 3:
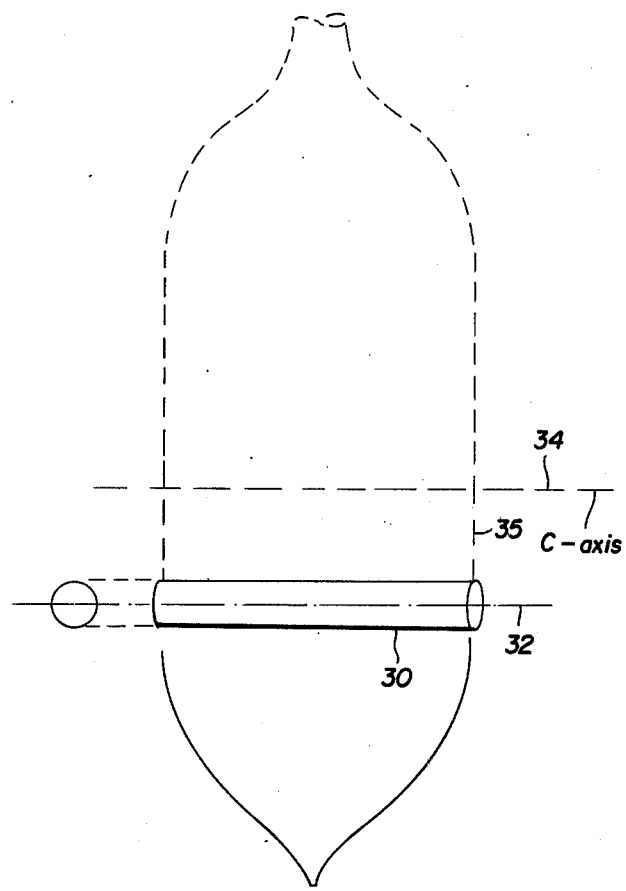
FIG. 3 shows a unicrystalline alpha alumina for use in preparing an article in accordance with the present invention.
Figure 4A:
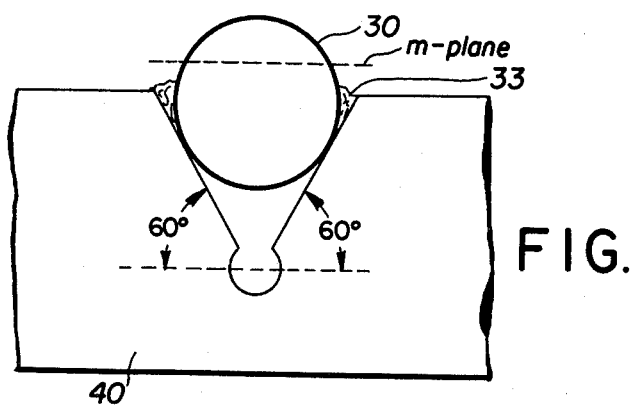
FIGS. 4a–4d illustrate steps in the fabrication of an article in accordance with the present invention.
Figure 4B:
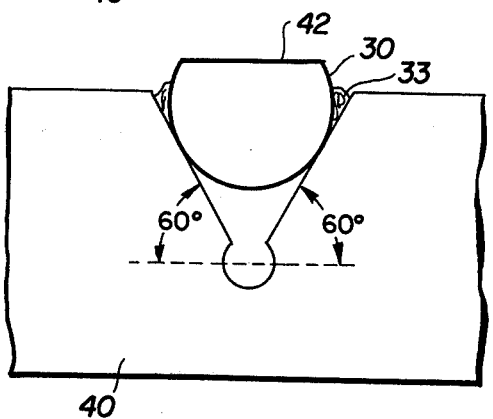
Figure 4C:
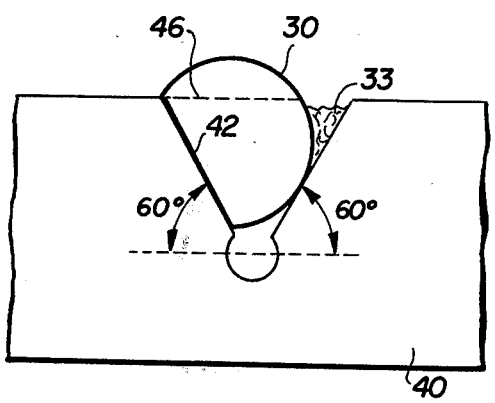
Figure 4D:
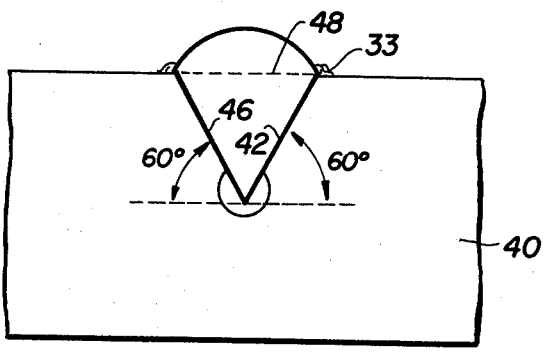

This can be readily achieved by providing a rod of unicrystalline alpha alumina, such as shown at 30 in Fig. 3, having its longitudinal axis 32 parallel to the C-axis 34 of the unicrystalline alpha alumina. For example, the rod can be routinely cut from a boule 35 grown by the Czochralski technique for example as described in U.S. Pat. No. 3,715,194 — Plooster. The m-plane orientation of the rod is identified by conventional x-ray techniques and the rod 30 is mounted by wax 33 on a "Meehanite" iron grinding plate 40 as shown in FIG. 4a with any m-plane thereof located as shown. The upper portion of the rod is subjected to grinding, e.g. surface grinder equipped with a bonded diamond abrasive wheel to provide a planar surface 42 shown in FIG. 4b. The planar surface 42 is thus aligned with an m-plane of rod 30. The rod 30 is subsequently removed from grinding plate 40 and rotated 60° by emplacement in the fixture 40 as shown in FIG. 4c. The new upper surface of rod 30 is subjected to grinding as before to obtain a planar surface indicated at 46 which due to the hexagonal symmetry of the m-planes, is also in alignment with an m-plane of rod 30. The rod 30 can be further rotated 60° as shown in FIG. 4d and subjected to grinding as before to provide a planar surface indicated at 48 which likewise is in alignment with an m-plane of rod 30. The resultant prism is as shown in FIG. 1 having edges parallel to the C-axis and planar surface in alignment with m-planes. This unique orientation ensures that high quality wearing edges can be achieved without fracture using conventional mechanical grinding techniques and such edges are resistant to fracture in use as scraping devices and the like, e.g. knife edge balance beams, total internal reflecting (TIR) prisms.

Figure 5:
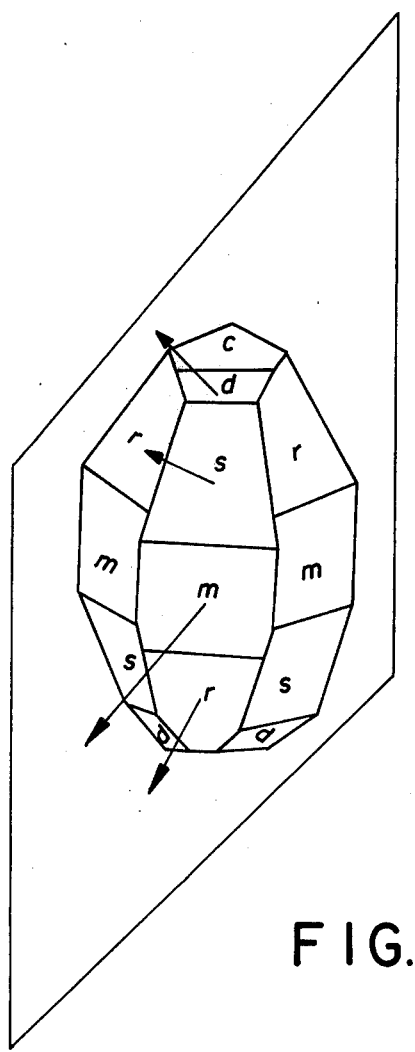
FIG. 5 illustrates the location of various crystallographic planes in the article of the present invention.

It is believed that these advantages are achieved due to the symetrical location established in the article of the present invention of the m {1$\bar{1}$00} r {1$\bar{1}$02} s {10$\bar{1}$1} and d {10$\bar{1}$4} planes using c/a axes ratio of 2.73. (That is, the indices are based on the structural unit cell.) The above-noted planes have been suggested as tending to fracture more readily than others in unicrystalline sapphire. (Journal of the American Ceramic Society Vol. 52, No. 9, September, 1969, "Fracture of Sapphire" — S.M. Wiederhorn). In the article of the present invention the above noted planes are symetrically disposed with their axes in a plane normal to the prism planar surfaces of the article as shown in FIG. 5. This configuration has been found to be critical in minimizing edge fracture during fabrication and use. Articles of the same prism shape but of random orientation regularly exhibit edge fracture during grinding and in use.

A particular advantage of the present invention is that grinding and polishing rates are essentially the same and reasonably predictable on all faces of the same prism, and on different prisms, since these faces are all aligned with m-planes. Also, the hardness and other mechanical properties are substantially the same on all faces for the same reason.

The following example will further illustrate the present invention.

EXAMPLE

A single crystal sapphire boule was prepared by the Czochralski technique having a crystallographic orientation known as "90°" wherein the C-axis of the crystal lies at an angle of 90° from the longitudinal axis of the boule. A diamond core drill mounted to the spindle of a milling machine using coaxial water coolant was employed to drill nominal 0.312 inch diameter rods of sapphire in lengths of approximately 2.0 inches from a boule positioned by x-ray orientation to allow the rods to be drilled with their longitudinal axes parallel with the C-axis within 1°. Using an x-ray diffractometer, individual rods were oriented for m-plane and marked by using a pencil to an accuracy within 2°. Rods so marked were positioned as shown in FIG. 4a on a grinding plate fixture such that the m-plane was parallel with the plate surface. The rods were secured with holding wax, and a flat area approximately 0.220 inch wide was ground on the group of rods using a water coolant and a diamond grinding wheel having 180/220 mesh diamond grit.

The plate containing the rods was transferred to a polishing lap, and the ground flat area of each rod was polished using 5 micron diamond abrasive powder in an oil vehicle to produce a surface finish of approximately 1 microinch CLA after the removal of approximately 0.006 inch of sapphire from the ground surface. The rods were subsequently removed from the plate, sawn and ground to have a length of 0.750 inch ± 0.002 inch. The rods were then remounted using the grinding/polishing fixture having a multiplicity of radially-placed 60° precision "v"-grooves (with an appropriate relief at the apex of the groove) of the type shown in FIGS. 4a thru 4c. The relief location is shown in these figures. The polished face was used as the reference face for mounting in this fixture. The plate containing the rods was then repositioned on the surface grinder and a second face approximately 0.200 inch wide was generated on the surface grinding machine. The plate was then repositioned on the polishing lap, and the second face was polished by removing 0.006 inch of material from the ground surface. At the junction of the first polished surface and the second polished surface a sharp, chip-free edge was formed. The partially-worked prism-shape component was then removed from the polishing/grinding fixture and re-positioned on that fixture as shown in FIG. 4c. The plate containing the rods was then re-positioned on the grinding machine as shown in FIG. 4d, and a final grinding operation using a very low index rate (0.0001 inch per index) was used to generate the final face of the prism to avoid grinding damage at the junction of the ground face with the two polished faces. The plate was removed from the grinding machine and re-positioned on the polishing lap. The final face of the prism was formed by removing approximately 0.006 inch plus that to establish final prism geometry such that lateral faces had an approximate width of 0.190 inch. The edges formed in this operation were also sharp and chip-free.

While the foregoing description has been directed to articles having a 60° included angle between m-plane surfaces, an article having a 120° included angle between m-plane surfaces is within the scope of the present invention. Such an article can be provided by the prism indicated at 28 in FIG. 2b.

Alpha alumina as used herein includes sapphire and ruby, e.g. alpha alumina containing from about 0.01 to 1.0% by weight chromia.

What is claimed is:

1. As an article of manufacture for use as a wearing edge in the cleaning of magnetic tape and similar applications, a body formed of unicrystalline alpha alumina having a wearing edge substantially parallel to the C-axis of the unicrystalline alpha alumina body and having ground and polished planar surfaces intersecting at said wearing edge, each of said planar surfaces being aligned with an m-plane of said unicrystalline alpha alumina body.

2. An article of manufacture in accordance with claim 1 in the form of an equilateral prism having three wearing edges substantially parallel to the C-axis and ground and polished planar surfaces, each of said planar surfaces being aligned with an m-plane of said unicrystalline alpha alumina body.

3. A method for making a wearing edge on a body of unicrystalline alpha alumina which comprises (i) providing a rod of unicrystalline alpha alumina having its longitudinal axis parallel to the C-axis of said unicrystalline alpha alumina (ii) mounting said rod length-wise on a grinding plate (iii) grinding a first length-wise portion of said rod to provide a first planar surface therein parallel to an m-plane of said rod (iv) grinding a second length-wise portion of said rod to provide a second planar surface which intersects said first planar surface at an angle of 60°.

* * * * *